United States Patent [19]

Kolich et al.

[11] Patent Number: 4,945,139
[45] Date of Patent: Jul. 31, 1990

[54] PROCESS FOR SURFACE TREATING PHOSPHONITRILIC FLUOROELASTOMERS

[75] Inventors: Charles H. Kolich; W. Dirk Klobucar; Jeffrey T. Books, all of Baton Rouge, La.

[73] Assignee: Ethyl Corporation, Richmond, Va.

[21] Appl. No.: 383,642

[22] Filed: Jul. 24, 1989

[51] Int. Cl.$^5$ .............................................. C08G 79/02
[52] U.S. Cl. ...................................... 525/538; 528/399
[58] Field of Search ......................... 525/538; 528/399

[56] References Cited

U.S. PATENT DOCUMENTS

| | | | |
|---|---|---|---|
| 3,370,020 | 2/1968 | Allcock et al. | 528/399 |
| 3,515,688 | 6/1970 | Rose | 528/399 |
| 3,888,800 | 6/1975 | Allcock | 528/399 |
| 4,005,171 | 1/1977 | Reynard et al. | 423/300 |

Primary Examiner—Harold D. Anderson
Assistant Examiner—T. Mosley
Attorney, Agent, or Firm—Richard J. Hammond

[57] ABSTRACT

A process for treating the surface of a cured phosphonitrilic fluoroelastomer of the formula

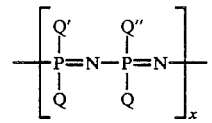

where x is an integer of from about 3 to about 50,000, Q and Q' are the same or different and are fluoroalkoxy of the formula $-OCH_2(CF_2)_mCF_2Z$ where m is an integer from 0 to 20 and Z is hydrogen or fluorine and Q" is a group having some olefinic unsaturation with a solution of an alkali metal fluoroalkoxide of the formula $MOC_n{}^f$ where M is an alkali metal and $C_n{}^f$ is a fluorocarbon moiety of the formula $-(CH_2)_y(CF_2)_nCF_3$ where y is 1 or 2 and n is an integer from 1 to 20. The process of this invention causes the replacement of some of the Q and Q' groups with $-OC_n{}^f$. The decreased number of Q and Q' where Z is hydrogen results in a cured phosphonitrilic fluoroelastomer surface displaying improved resistance to polar solvents.

12 Claims, No Drawings

PROCESS FOR SURFACE TREATING PHOSPHONITRILIC FLUOROELASTOMERS

This invention relates to the treatment of cured phosphonitrilic fluoroelastomers to produce a material having enhanced solvent resistance. More particularly, the invention is directed to the surface treatment of certain cured phosphonitrilic fluoroelastomeric parts to improve their resistance to degradation from polar solvents such as certain hydraulic fluids, methanol, and the like.

The preparation of phosphazene homopolymers by reaction of polymerized $PNCl_2$ with various alkoxides is taught in Allcock, et al, U.S. Pat. No. 3,370,020 and to Rose, U.S. Pat. No. 3,515,688, and elsewhere in the literature.

The properties of the homopolymers are excellent for certain uses, but are less satisfactory for other purposes and as a consequence, copolymers with randomly distributed units have been developed.

Conventional methods of producing copolymers utilize the reaction of mixtures of alkoxides with poly(dichlorophosphazene) which can result in copolymers having structures and properties dependent on the relative reactivities of the alkoxides with the chloropolymer. The relative reactivities depend both on steric and electronic factors of the entering ligand.

In Allcock, U.S. Pat. No. 3,888,800, a method of preparing copolymers is disclosed that permits the formation of copolymers having a controlled structure. Briefly, that method involves the following steps:
1. Preparation and polymerization of $(PNCl_2)_3$ by any suitable means known in the art.
2. Reaction of a solution of the chloropolymer, $[PNCl_2]_n$ with a suitable alkoxide to produce a homopolymer with two identical groups attached to each phosphorus atom in a polymer, the skeletal chain of which comprises recurring units represented by the general formula:

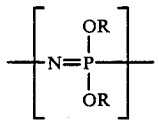

3. Further reaction of the homopolymer solution with a different ligand-OR' can result in a ligand exchange process dependent upon the relative reactivities of the groups OR and OR' whereby a selected number of groups OR are replaced by groups OR', resulting in formation of a copolymer having a controlled structure. Such polymer therefore can be tailored for desired properties.

Among the more desirable properties of the phosphazene elastomers is good solvent resistance. Materials displaying such characteristics are typically those where R' is a fluorocarbon such as $—(CH_2)_y(CF_2—)_nCF_3$ where y is 1 or 2 and n is 1 to 20. Rose, referred to above, discloses the direct preparation of these highly fluorinated phosphazenes by substitution of poly(dichlorophosphazene) with sodium fluoroalkoxides in solution. These compositions display acceptable low temperature flexibility and high physical strength and are conceded to be excellent candidates for gasket, bladder, fuel tank sealing applications and the like where fluids adversely effecting conventional elastomeric compositions are typically employed. Unfortunately, while the prior art processes are able to produce such elastomers, the homogeneous substitution and/or interchange-replacement techniques yield highly impure copolymers displaying very low or no solubility in most solvents. As such these copolymers are essentially unusable.

Accordingly, it is an object of the present invention to provide a process for producing a phosphonitrilic fluoroelastomer displaying superior solvent resistance.

It is a further object of the present invention to provide a process for the treatment of cured phosphonitrilic fluoroelastomers that will result in a product displaying resistance to polar solvents while retaining other good physical characteristics.

It is an additional objective of the present invention to provide a process for surface treatment of cured phosphonitrilic fluoroelastomers by replacement of some or all of certain difluoromethyl-terminated aliphatic fluorocarbon substituents ($—CF_2H$) on the polymer backbone with the trifluoromethyl-terminated aliphatic fluorocarbon substituent ($—CF_3$).

In summary, the invention contemplates treating the surface of a cured phosphonitrilic fluoroelastomers of the formula:

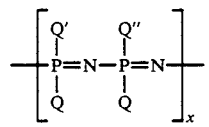

where x is an integer from about 3 to about 50,000, Q and Q' are the same or different and are fluoroalkoxy of the formula $—OCH_2(CF_2)_mCF_2Z$ where m is an integer of from 0 to 20 and Z is hydrogen or fluorine and Q'' is a group having some olefinic unsaturation, so as to cause the replacement of some or all of the Q and/or Q' with the group $—OC_{n'}$ where $C_{n'}$ is an aliphatic fluorocarbon moiety represented by the formula $—(CH_2)_y(CF_2)_nCF_3$ where y is 1 or 2 and n is an integer of from 1 to 20 and $—OC_{n'}$ may be the same or different than Q of from 1 to 20 and $-OC_{n'}$ may be the same or different than Q and Q' where Z is fluorine. The surface treatment process is a heterogeneous replacement reaction and is carried out by exposing the surface of the above cured phosphonitrilic fluoroelastomer to an alkali metal fluoroalkoxide of the formula $MOC_{n'}$ where M is an alkali metal and $C_{n'}$ is as previously defined.

In treating the cured phosphonitrilic fluoroelastomer by the process of the present invention, an alkali metal fluoroalkoxide of the formula $MOC_{n'}$ where M is the alkali metal and $C_{n'}$ is an aliphatic fluorocarbon moiety of the formula $—(CH_2)_y(CF_2)_nCF_3$ where y is 1 or 2 and n is an integer from 1 to 20 is first prepared. See for example Allcock, U.S. Pat. No. 3,888,800 referred to earlier.

The alkali metal of the alkoxide useful in the process of this invention can be selected from any of the metals of Group IA of the Periodic Table of Elements. Mixtures of such metals may also be used. Preferably these metals are sodium or potassium, most preferably sodium.

The fluoroalcohols used to prepare the fluoroalkoxide component of the process of the present invention can be any alcohol of the formula $CF_3(CF_2)_n(CH_2)_yOH$ where y is 1 or 2 and n is an integer of from 1 to 20.

Such alcohols are illustrated by 2,2,3,3,4,4,5,5,5-nonafluoropentanol, 2,2,3,3,4,4,-5,5,6,6,6-undecafluorohexanol 2,2,3,3,4,4,5,5,6,6,7,7,7-tridecafluoroheptanol and the like. Particularly preferred fluoroalcohols are 2,2,3,3,4,4,4-heptafluorobutanol, 2,2,3,3,4,4,-5,5,6,6,7,7,8,8,8-pentadecafluorooctanol, and the like.

The solvent useful in this process should be inert, i.e., does not react with either of the reactants to any appreciable extent. Thus such solvent or mixture of solvents should not contain for example any carboxy functionality. In addition to being inert to the reactants, the solvent must be able to substantially swell the cured phosphonitrilic fluoroelastomer in order to facilitate exchange of the fluoroalkoxy groups. The normally liquid solvents of the cyclic ethers are therefore preferred. Particularly preferred is tetrahydrofuran or 1,4-dioxane.

The extent of exchange is dependent on the quantity of compound $MOC_{n}{}^{f}$ in the solution used to surface treat the cured phosphazene. Solutions that are too dilute do not displace enough of the difluoromethyl terminated substituents on the polymer backbone to impart the desired degree of resistance to polar solvents. Thus alkoxide concentrations of above 20%, preferably above 30%, most preferably above 35% are useful in practicing the process of this invention.

The process of the present invention is normally conducted at room temperature, i.e., 25° C. although higher temperatures may also be used. Temperatures in excess of 100° C. should be avoided as well as those below 0° C.

To treat the surface of the cured material, a container inert to the alkali metal alkoxide is used; for example glass, porcelain or stainless steel. The cured phosphazene part for treatment is placed in the container and sufficient fluoroalkoxide solution is added to cover the part. Typical treatment times at room temperature are in the range of 1–24 hours, shorter or longer times being required when using higher or lower temperatures and alkoxide concentrations.

After treatment, the ready-to-use parts are rinsed with fresh solvent and dried.

Q and Q' in the phosphonitrilic fluoroelastomer useful in the present invention are fluoroalkoxy groups derived from fluoroalcohols, especially those of the formula $Z(CF_2)_m CH_2OH$ in which Z is hydrogen or fluorine and m is an integer from 1 to 20. Such alcohols are illustrated by trifluoroethanol, 2,2,3,3,3-pentafluoropropanol, 2,2,3,3,4,4,4-heptafluorobutanol; 2,2,3,3-tetrafluoropropanol; 2,2,3,3,4,4,5,5-octafluoropentanol; 2,2,3,3,4,4,5,5,6,6,7,7-dodecafluoroheptanol and the like. In instances where it is desired to incorporate mixed Q and Q' substituent groups in copolymers, mixtures of the foregoing alcohols may be employed.

The groups Q" having some olefinic unsaturation are typically alkenyloxy (i.e. The oxy radical of alkenyl compounds) and alkenylaryloxy (alkenyl-substituted aryloxy) groups and are ethylenically unsaturated monovalent radicals which are capable of undergoing a crosslinking chemical reaction. Examples of such crosslinking moieties and methods for their cure are described in U.S. Pat. Nos. 3,702,833; 3,844,983; 3,888,799; 4,055,520; and 4,061,606 which are hereby incorporated by reference. Such groups having olefinic unsaturation include monovalent radicals such as —OCH=CH$_2$; —OR'CH=CH$_2$;

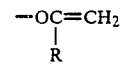

—OR'CF=CF$_2$; —OCH$_2$RC=CF$_2$ and —OR'R$^2$ in which R is an aliphatic or aromatic radical, R' is alkylene or arylene and R$^2$ is vinyl, allyl, crotyl or the like.

The alkenyloxy groups derived from unsaturated aliphatic alcohols are illustrated by allyl alcohol, 3-butene-1-ol, 2,3,3-fluoropropen-1-ol and the like.

The alkenylaryloxy groups may be derived from unsaturated aromatic alcohols such as vinylphenols, allylphenols, eugenol, isoeugenol and the like. A preferred ethylenically unsaturated radical is ortho-allylphenoxy.

Such olefinic unsaturated crosslinking substituents may be present in an amount between about 0.01 mole percent to about 55 mole percent and more commonly from about 0.1 mole percent to about 10 mole percent based on the replaceable chlorine in the starting poly(dichlorophosphazene).

Poly(dichlorophosphazene) polymers which are employed as starting materials in preparing the polymers of this invention are well known in the art as illustrated in U.S. Pat Nos. 3,370,020; and 4,005,171, the disclosures of which are incorporated herein by reference.

These polymers have the general formula —(NPCl$_2$)$_x$—, in which x may range from 20 to 50,000 or more. As described in the aforementioned references, the polymers are in general prepared by the thermal polymerization of cyclic oligomers having the formula —(NPCl$_2$)$_x$—, in which x is an integer of from 3 to 7, with the cyclic trimer and tetramer often comprising up to 90% of the oligomers.

The specific conditions of temperature, pressure and time employed in the thermal polymerization of the cyclic oligomers can vary considerably depending on whether or not the polymerization is catalyzed. Thus, temperatures may range from about 180° C. to about 300° C., pressures may range from a vacuum of less than about 10$^{-1}$ Torr to superatmospheric and times may range from 30 minutes to about 48 hours.

A preferred process for preparing the poly(dichlorophosphazene) polymers used in the process of this invention is described in the aforementioned U.S. Pat. No. 4,005,171.

The elastomers treated by the method of this invention are prepared as follows: a suitable fluoroalcohol or a mixture of fluoroalcohols, together with a compound having some aliphatic unsaturation, e.g.,o-allylphenol, are slowly added to sodium metal in dried tetrahydrofuran under a nitrogen atmosphere in a 3 neck, 12 liter, round bottom Pyrex flask fitted with a dropping funnel, a dry ice condenser with a H$_2$ vent line, and a motor driven glass stirrer. The flask is immersed in a thermostatically controlled liquid bath. After the reaction of the alcohols with sodium has proceeded to completion, a solution of open chain poly(dichlorophosphazene) in cyclohexane is added rapidly to the mixture of fluoroalkoxide(s) and o-allylphenoxide. The chlorine atoms of the poly(dichlorophosphazene) combine readily with the alkali metal of the alkoxides and as a result, the substituted polyphosphazene derivative is produced. The derivatized product is recovered by centrifugation of filtration of the neutralized reaction mixture to remove the alkali metal chloride followed by addition of the resulting salt-free polymer solution to a non-solvent to precipitate the polymer. Terpolymers and copolymers containing the above indicated unsaturation can be compounded and cured, i.e.. vulcanized, to provide the material useful for the process of this invention.

EXAMPLES 1–16

Exchange reactions on EYPEL®-F O-rings are summarized in Table 1. EYPEL®-F is the trademark of ETHYL Corporation and is a poly(fluoroalkoxy)-phosphazene elastomer. All reactions were carried out in dry 4-oz. screw cap bottles by total immersion of an O-ring (dried at 100° C.) in the bath solution. All bath solutions contained sodium heptafluorobutoxide in tetrahydrofuran (THF), and in addition, some of the solutions also contained pentadecafluorooctanol (Examples 5, 6, 7, 10, 11, 14 and 15) and isopropanol (Examples 8–15). After the treatment, the O-rings were rinsed several times in fresh solvent (either THF or isopropanol) and then dried to a constant weight. As an indicator of resistance to polar solvents, the volume swell of the O-rings was determined in methanol (70 hr at room temperature) and in the phosphate ester hydraulic fluid, Skydrol 500B (168 hr at room temperature).

EXAMPLES 17–20

To demonstrate that sodium heptafluorobutoxide exchanges with the trifluoroethoxy ($-OCH_2CF_3$) and telomer fluoroalkoxy $-OCH_2(CF_2CF_2-)_pH$ groups (where p is 1–7) on the phosphazene polymer, homogeneous exchange reactions were carried out in THF on uncrosslinked soluble polymer. In each example, about 25 mole % of the original fluoroalkoxy substituents were replaced by heptafluorobutoxy groups under relatively mild conditions (25°–70° C./4–11 hr).

EXAMPLE 17

Poly[bis(trifluoroethoxy)phosohazene]

A solution of 25.63 g (0.1054/n mole) of the white fibrous polymer $[PN(OCH_2CF_3)_2]_n$ (polymer contains 0.6 mole % eugenoxy cure sites) in 301.4 g THF (HPLC grade, dried over sieves and filtered) is treated with 74.21 g (0.1069 mole) of a THF solution of $NaOCH_2CF_2CF_2CF_3$ (1.44 meq/g, 53 ppm water). Polymer began to precipitate from the hazy viscous solution after stirring at room temperature for 15 minutes. The mixture was refluxed (69° C.) for 4 hours to complete the polymer precipitation. The yellow liquid phase (326 g) was decanted, and the polymer was extracted with hot THF (2 x 280 g). The last extraction liquid had a pH of 6–7. A solution of the polymer dissolved in a mixture of 1,1,2-trichlorotrifluoroethane/THF was then precipitated into n-heptane. After drying in a vacuum oven (0.1 torr/75° C./16 hours), the light brown elastomeric product weighed 28.5 g. Proton NMR (in Freon TA) indicated the polymer still contained 0.3 mole % eugenoxy cure sites. Fluorine NMR showed the fluoroalkoxy substituent distribution was 74.0 mole % $OCH_2CF_3$ and 26.0 mole % $OCH_2CF_2CF_2CF_3$.

EXAMPLE 18 EYPEL®-F Gum (65 mole % $OCH_2CF_3$/35 mole $OCH_2(CF_2CF_2)_pH$

A 29.47 g (0.0915/n mole) portion of EYPEL®-F polymer (see Table 2 for composition) was dissolved in 417.5 g THF (HPLC grade, sieve dried and filtered) and treated with 63.97 g (92.1 meq) of a THF solution of $NaOCH_2CF_2CF_2CF_3$. The clear yellow solution showed no evidence of reaction at room temperature. After 11 hours at reflux (70° C.), the solution was dark brown and the polymer remained dissolved. No reaction was evident when 4.938 g (92.3 moles) of granular $NH_4Cl$ was added to neutralize the alkoxide. This mixture was poured into a mixture of ice (1315 g) and Water (854 g). After decanting the yellow aqueous phase from the polymer crumb, the gum was washed with water (3 x IL) and dried in a vacuum oven (4 torr/75° C./16 hours). The elastomeric product weighed 31.3 g. No o-allyphenoxy cure sites were detected by proton NMR. Fluorine NMR indicated a fluoroalkoxy substituent distribution of 51.5 mole % $OCH_2CF_3$, 21.2 mole % $OCH_2(CF_2CF_2)pH$, and 27.3 mole % $OCH_2CF_2CF_2CF_3$.

EXAMPLE 19

EYPEL®-F Gum (83 mole % $OCH_2CF_3$/17 mole % $OCH_2(CF_2CF_2)_pH$)

A 10.06 g (35.5/n mmole) sample of EYPEL®-F polymer (See Table 2 for composition) was dissolved in 140.6 g THF (HPLC grade, sieve dried and filtered) and then treated with 24.63 g (35.5 meq) of a THF solution of $NaOCH_2CF_2CF_2CF_3$ at 25° C. After stirring for 6 hours at 25° C., only a trace amount of insoluble polymer had formed. No change was observed after refluxing (70° C.) the hazy yellow solution for 7 hours. The mixture was poured into a mixture of ice (871 g), water (1001 g), and concentrated hydrochloric acid (3.63 g, 36.8 mmole). The clear colorless aqueous phase (pH 3) was decanted from the precipitated gum. After rinsing with water (4 x IL), the polymer was dried in a vacuum oven (3 torr/80° C./16 hours) to obtain 10.21 g of elastomeric product. No o-allylphenoxy cure sites were detected in the polymer by proton NMR analysis. The fluorine NMR showed a fluoroalkoxy substituent distribution of 62.6 mole % $OCH_2CF_3$, 12.6 mole % $OCH_2(CF_2CF_2)_pH$, and 24.7 mole % $OCH_2CF_2CF_2CF_3$.

EXAMPLE 20

EYPEL®-F Gum (90 mole % $OCH_2CF_3$/10 mole % $OCH_2CF_2CF_2)_pH$)

A 10.13 g (38.0/n mmole) portion of a 90 mole % $OCH_2CF_3$/10 mole % $OCH_2(CF_2CF_2)_pH$ EYPEL®-F polymer dissolved in 139.2 g THF (HPLC grade, sieve dried and filtered) was treated with a 26.01 g (37.4 meq) portion of a THF solution of $NaOCH_2CF_2CF_2CF_3$. Within 20 minutes of stirring at 25° C., polymer began to precipitate from the yellow solution. Polymer precipitation was complete after 6 hours at 25° C. The liquid (136.5 g) was decanted, and the solid polymer was extracted with hot THF (2 x 145 g). The liquid from the last extraction had a pH of 6.5. The polymer was dissolved over a period of two days in a mixture of 1,1,2-trichlorotrifluoroethane (516.8 g), acetone (55.2 g), and THF (26.8 g). After pouring the viscous polymer solution into n-heptane (2L), the precipitated polymer was recovered and dried in a vacuum desiccator (0.2 torr/40° C./4 hours) to obtain 8.12 g of elastomeric product. Proton NMR (in trichlorotrifluoroethane/acetone-$d_6$) showed the amount of o-allylphenoxy cure sites was unchanged (0.3 mole %). Fluorine NMR indicated a substituent distribution of 68.0 mole % $OCH_2CF_3$, 6.6 mole % $OCH_2(CF_2CF_2)_pH$, and 25.4 mole % $OCH_2CF_2CF_2CF_3$.

TABLE 1

Treatment of Cured Fluoroalkoxyphosphazene Parts to Improve Polar Fluid Resistance

| Example | Solvent Mixture (wt %) THF | Solvent Mixture (wt %) IPA | NaOCH$_2$(CF$_2$)$_2$CF$_3$ (wt %) | HOCH$_2$(C$_7$F$_{15}$) (wt %) | Time in Bath at 25° C. (hr) | O-Ring wt. Change (%) | Volume Swell at 25° C. Methanol (70 hr) | Volume Swell at 25° C. Skydrol 500B (168 hr) |
|---|---|---|---|---|---|---|---|---|
| 1 | 100 | 0.0 | 32.0 | 0.0 | 2.5 | n.d. | 105 | n.d. |
| 2 | 100 | 0.0 | 32.0 | 0.0 | 16.0 | n.d. | 27 | n.d. |
| 3 | 100 | 0.0 | 36.6 | 0.0 | 6.0 | +18.7 | 99.3 | 80.5 |
| 4 | 100 | 0.0 | 36.6 | 0.0 | 24.0 | +21.2 | 73.8 | 69.1 |
| 5 | 100 | 0.0 | 18.2 | 34.7 | 2.5 | +3.9 | 166.3 | 139.4 |
| 6 | 100 | 0.0 | 18.2 | 34.7 | 6.0 | +11.2 | 122.2 | 86.8 |
| 7 | 100 | 0.0 | 18.2 | 34.7 | 24.0 | +30.6 | 49.4 | 24.4 |
| 8 | 20 | 80 | 10.4 | 0.0 | 6.0 | +0.3 | 183.0 | 162.7 |
| 9 | 20 | 80 | 10.4 | 0.0 | 24.0 | +2.4 | 181.8 | 132.4 |
| 10 | 20 | 80 | 6.4 | 12.0 | 6.0 | +1.8 | 173.3 | n.d. |
| 11 | 20 | 80 | 6.4 | 12.0 | 24.0 | +7.3 | 126.3 | n.d. |
| 12 | 10 | 90 | 5.6 | 0.0 | 6.0 | −0.2 | 175.3 | 170.2 |
| 13 | 10 | 90 | 5.6 | 0.0 | 24.0 | +0.1 | 179.1 | 167.9 |
| 14 | 10 | 90 | 3.6 | 6.7 | 6.0 | +0.2 | 180.5 | 164.8 |
| 15 | 10 | 90 | 3.6 | 6.7 | 24.0 | +1.3 | 176.3 | 157.5 |
| 16 | 0.0 | 0.0 | 0.0 | 0.0 | 0.0 | 0.0 | 179.5 | 167.4 | n.d. = not determined
THF and IPA are tetrahydrofuran and isopropyl alcohol

TABLE 2

Effect of Exchange Reactions on Substituent Distribution

| Example | Reaction Conditions (°C./hr) | Initial Polymer Composition (mole %) TFE | Initial Polymer Composition (mole %) Telomer | Initial Polymer Composition (mole %) Cure Site* | Final Polymer Composition (mole %) TFE | Final Polymer Composition (mole %) Telomer | Final Polymer Composition (mole %) Cure Site* | Final Polymer Composition (mole %) Heptafluorobutoxy |
|---|---|---|---|---|---|---|---|---|
| 17** | 69°/4 hr | 99.4 | — | 0.6 | 73.8 | — | 0.3 | 25.9 |
| 18 | 70°/11 hr | 64.8 | 34.9 | 0.3 | 51.5 | 21.2 | — | 27.3 |
| 19 | 70°/7 hr | 82.9 | 16.9 | 0.2 | 62.6 | 12.6 | — | 24.7 |
| 20** | 25°/6 hr | 90.2 | 9.5 | 0.3 | 67.8 | 6.6 | 0.3 | 25.3 |

*Cure site is eugenoxy for Example 17. All other starting polymers have o-allylphenoxy cure sites.
**Product is uncrosslinked THF-insoluble elastomer.

We claim:

1. A process for treating a cured phosphonitrilic fluoroelastomer of the formula

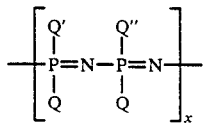

where x is an integer of from about 3 to about 50,000, Q and Q' are the same or different and are fluoroalkoxy of the formula —OCH$_2$(CF$_2$)$_m$CF$_2$Z where m is an integer from 0 to 20 and Z is hydrogen or fluorine and Q'' is a group having some olefinic unsaturation comprising treating the surface of said cured phosphonitrilic fluoroelastomer with a solution of an alkali metal fluoroalkoxide of the formula MOC$_{n}$f where M is an alkali metal and C$_{n}$f is a fluorocarbon moiety represented by the formula —(CH$_2$)$_y$(CF$_2$)$_n$CF$_3$ where y is 1 or 2 and n is an integer from 1 to 20; replacing some of said Q and Q', where Q and Q' are as previously defined with said moiety OC$_{n}$f; whereby the resulting cured phosphonitrilic fluoroelastomer possesses a decreased number of fluoroalkoxide groups where Z is hydrogen.

2. The process of claim 1 wherein said treatment is carried out at 20° to 100° C. for about 1 hour to about 24 hours.

3. The process of claim 1 wherein n is an integer from 1 to 7.

4. The process of claim 3 where the alkali metal is sodium.

5. The process of claim 1 where the solvent for said solution is cyclic or linear aliphatic ether, aliphatic ketone, aliphatic alcohol, aromatic hydrocarbon or mixtures thereof.

6. The process of claim 1 wherein said C$_{n}$f is 2,2,3,3,4,4,5,5,5-nonafluoropentyl, 2,2,3,3,4,4,5,5,6,6,6-undecafluorohexanol, 2,2,3,3,4,4,5,5,6,6,7,7,7-tridecafluoroheptyl, 2,2,3,3,4,4,4-heptafluorobutyl or 2,2,3,3,4,4,5,5,6,6,7,7,-8,8,8-pentadecafluorooctyl.

7. A phosphazene polymer prepared by treating a cured phosphonitrilic fluoroelastomer of the formula

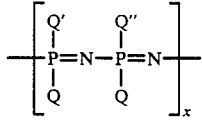

where x is an integer of from about 3 to about 50,000, Q and Q' are the same or different and are fluoroalkoxy of the formula —OCH$_2$(CF$_2$)$_m$CF$_2$Z where m is an integer from 0 to 20 and Z is hydrogen or fluorine and Q'' is a group having some olefinic unsaturation comprising treating the surface of said cured phosphonitrilic fluoroelastomer with a solution of an alkali metal fluoroalkoxide of the formula MOC$_{n}$f where M is an alkali metal and C$_{n}$f is a fluorocarbon moiety represented by the formula —(CH$_2$)$_y$(CF$_2$)$_n$CF$_3$ where y is 1 or 2 and n is an integer from 1 to 20; replacing some of said Q and Q', where Q and Q' are as previously defined with said moiety OC$_{n}$f; whereby the resulting cured phosphonitrilic fluoroelastomer possesses a decreased number of fluoroalkoxide groups where Z is hydrogen.

8. The phosphazene polymer of claim 7 wherein said treatment is carried out at 20° to 100° C. for about 1 hour to about 24 hours.

9. The phosphazene polymer of claim 7 wherein n is an integer from 1 to 7.

10. The phosphazene polymer of claim 9 where the alkali metal is sodium.

11. The phosphazene polymer of claim 7 where the solvent for said solution is cyclic or linear aliphatic ether, aliphatic ketone, aliphatic alcohol, aromatic hydrocarbon or mixtures thereof.

12. The phosphazene polymer of claim 7 wherein said $C_n{}^f$ is 2,2,3,3,4,4,5,5,5-nonafluoropentyl, 2,2,3,3,4,4,5,5,6,6,6-undecafluorohexanol, 2,2,3,3,4,4,5,5,6,6,7,7,7-tridecafluoroheptyl, 2,2,3,3,4,4,4-heptafluorobutyl or 2,2,3,3,4,4,5,5,6,6,7,7,8,8,8-pentadecafluorooctyl.

* * * * *